US012555895B2

(12) United States Patent
Brock

(10) Patent No.: US 12,555,895 B2
(45) Date of Patent: Feb. 17, 2026

(54) DOUBLE-SECTION, LOW-PROFILE, LOW-OBSERVABLE, WIDE-BAND, AZIMUTHALLY-OMNI-DIRECTIONAL MONOPOLE ANTENNA

(71) Applicant: The United States of America, as represented by the Secretary of the Navy, Arlington, VA (US)

(72) Inventor: David Walker Brock, San Diego, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 162 days.

(21) Appl. No.: 18/733,083

(22) Filed: Jun. 4, 2024

(65) Prior Publication Data

US 2026/0039014 A1 Feb. 5, 2026

(51) Int. Cl.
*H01Q 1/36* (2006.01)
*H01Q 5/25* (2015.01)
*H01Q 17/00* (2006.01)

(52) U.S. Cl.
CPC ................. *H01Q 1/36* (2013.01); *H01Q 5/25* (2015.01); *H01Q 17/008* (2013.01)

(58) Field of Classification Search
CPC ........... H01Q 1/36; H01Q 5/25; H01Q 17/008
See application file for complete search history.

(56) References Cited

U.S. PATENT DOCUMENTS 7,286,094 B2 * 10/2007 Ratni ....................... H01Q 9/28 343/773
2024/0380111 A1 * 11/2024 Verd ........................ H01Q 7/00

OTHER PUBLICATIONS buyantenna.com; Harvest CBC-430 350-480 MHz 6 DBi 300 Watts UHF Biconical Antenna; online advertisement; accessed at https://buyantenna.com/index.php?route=product/product&product_id=491; Mar. 11, 2024.

* cited by examiner

*Primary Examiner* — Daniel Munoz
(74) *Attorney, Agent, or Firm* — Naval Information Warfare Center Pacific; Kyle Eppele; J. Eric Anderson

(57) ABSTRACT

A low-profile antenna comprising upper and lower sets of conductive arms capacitively loaded by upper and lower conductive rings respectively connected to distal ends of the upper and lower sets of conductive arms. The upper and lower conductive arms have edges that conform to prolate ellipsoid dome shapes that each have a major axis that aligns with a center axis. The upper and lower conductive arms converge at an upper hub and a lower hub at crowns of the prolate ellipsoid dome shapes, which have interiors that are substantially filled with RF-absorbing material. The upper and lower hubs are separated by an air gap.

20 Claims, 9 Drawing Sheets

DOUBLE-SECTION, LOW-PROFILE, LOW-OBSERVABLE, WIDE-BAND, AZIMUTHALLY-OMNI-DIRECTIONAL MONOPOLE ANTENNA

FEDERALLY-SPONSORED RESEARCH AND DEVELOPMENT

The United States Government has ownership rights in the invention claimed herein. Licensing and technical inquiries may be directed to the Office of Research and Technical Applications, Naval Information Warfare Center Pacific, Code 72110, San Diego, CA, 92152; voice (619) 553-5118; NIWC_Pacific_T2@us.navy.mil. Reference Navy Case Number 210272.

BACKGROUND OF THE INVENTION

The invention claimed herein relates to radio frequency (RF) antennas. Large antennas, while effective/efficient in many instances, can be unsightly and result in unwanted reflections of incident RF radiation. There is a need for a low-profile antenna that can operate over a wide bandwidth.

SUMMARY

Described herein is an embodiment of a low profile antenna that comprises an upper and lower set of conductive arms. The upper set of conductive arms is capacitively loaded by an upper conductive ring connected to distal ends of the upper set of conductive arms. Each conductive arm of the upper set has an edge that conforms to a prolate ellipsoid dome shape that has a major axis that aligns with a center axis. The upper set of conductive arms converge at an upper hub at a crown of the prolate ellipsoid dome, an interior of which is substantially filled with an upper absorber made of RF-absorbing material. The lower set of conductive arms is capacitively loaded by a lower conductive ring, which is connected to a ground plane and to distal ends of the lower set of conductive arms. Each of the conductive arms of the lower set has an edge that conforms to an inverted prolate ellipsoid dome that has a major axis that aligns with the center axis. The lower set of conductive arms converge at a lower hub at a crown of the inverted prolate ellipsoid dome, an interior of which is substantially filled with a lower absorber made of RF-absorbing material. The upper and lower hubs are separated by an air gap.

Also described herein is an embodiment of the low-profile antenna that comprises a ground plane and upper and lower antenna sections. The upper antenna section has an upper hub, an upper set of conductive arms extending radially from the upper hub, and an upper conductive ring disposed parallel to the ground plane and electrically connected to distal ends of each of the arms of the upper set. Each arm of the upper set has a surface that substantially conforms to an upper prolate ellipsoid dome shape that has a crown aligned with the upper hub and a base aligned with the upper conductive ring. The lower antenna section has a lower hub, a lower set of conductive arms extending radially from the lower hub, and a lower conductive ring disposed parallel to, and in contact with, the ground plane and electrically connected to distal ends of each of the arms of the lower set of conductive arms. Each arm of the lower set of conductive arms has a surface that substantially conforms to a lower prolate ellipsoid dome shape that has a crown aligned with the lower hub and a base aligned with the lower conductive ring. The upper and lower antenna sections share a common center axis and the upper and lower hubs are separated by an air gap. The upper antenna section is rotationally offset from the lower antenna section about the center axis such that no two arms of the upper and lower sets of conductive arms are vertically aligned with each other.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed antenna below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
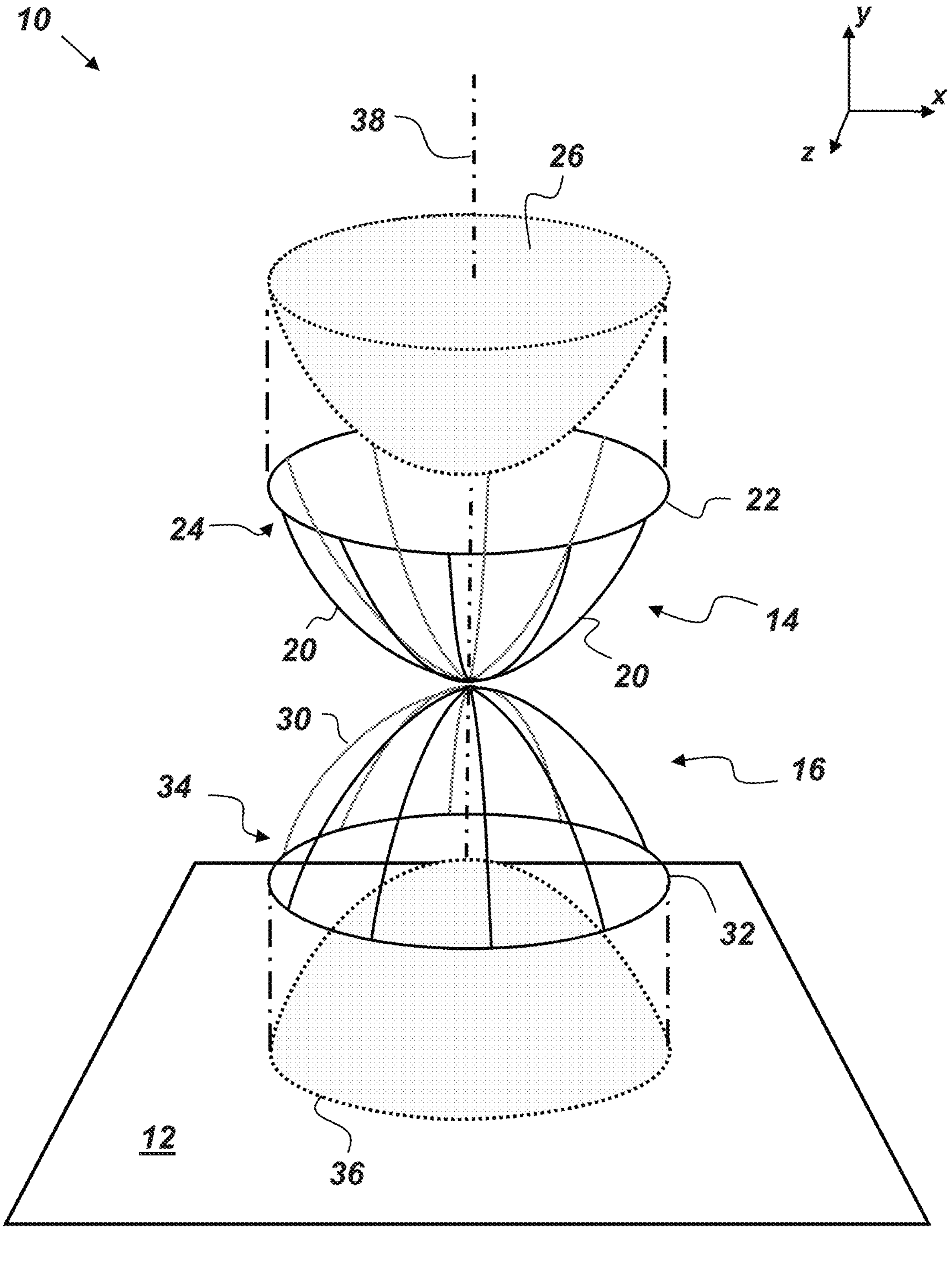
FIG. 1 is a perspective-view illustration of an embodiment of a low-profile antenna.

FIG. 1 is a perspective-view illustration of an embodiment of a double-section, low-profile antenna 10 (hereinafter referred to as low-profile antenna 10) that comprises, consists of, or consists essentially of a ground plane 12, an upper antenna section 14, and a lower antenna section 16. Various embodiments of the low-profile antenna 10 are described herein in reference to an x-y-z mutually-orthogonal coordinate axes system where the ground plane 12 is disposed in an x-z plane at y=0. The upper antenna section 14 comprises an upper set of conductive arms 20 extending radially from an upper hub 18 (See FIG. 2), and an upper conductive ring 22. The upper conductive ring 22 is disposed parallel to the ground plane 12 and is electrically connected to distal ends 24 of each of the upper conductive arms 20. Each upper conductive arm 20 has a surface (e.g., top surface of upper arm 42 shown in FIG. 2) that substantially conforms to an upper prolate ellipsoid dome shape 26.

The lower antenna section 16 comprises a lower set of conductive arms 30 extending radially from a lower hub 28 (See FIG. 2), and a lower conductive ring 32. The lower conductive ring 32 is disposed parallel to, and is electrically connected to, the ground plane 12. The lower conductive ring 32 is also electrically connected to distal ends 34 of each of the lower conductive arms 30. Each lower conductive arm 30 has a surface (e.g., bottom surface of lower arm 48 shown in FIG. 2) that substantially conforms to a lower prolate ellipsoid dome shape 36. The upper and lower antenna sections 14 and 16 share a common center axis 38. The upper antenna section 14 is rotationally offset from the lower antenna section 16 about the center axis 38 such that no upper conductive arm 20 is vertically aligned with a lower conductive arm 30.

Figure 2:
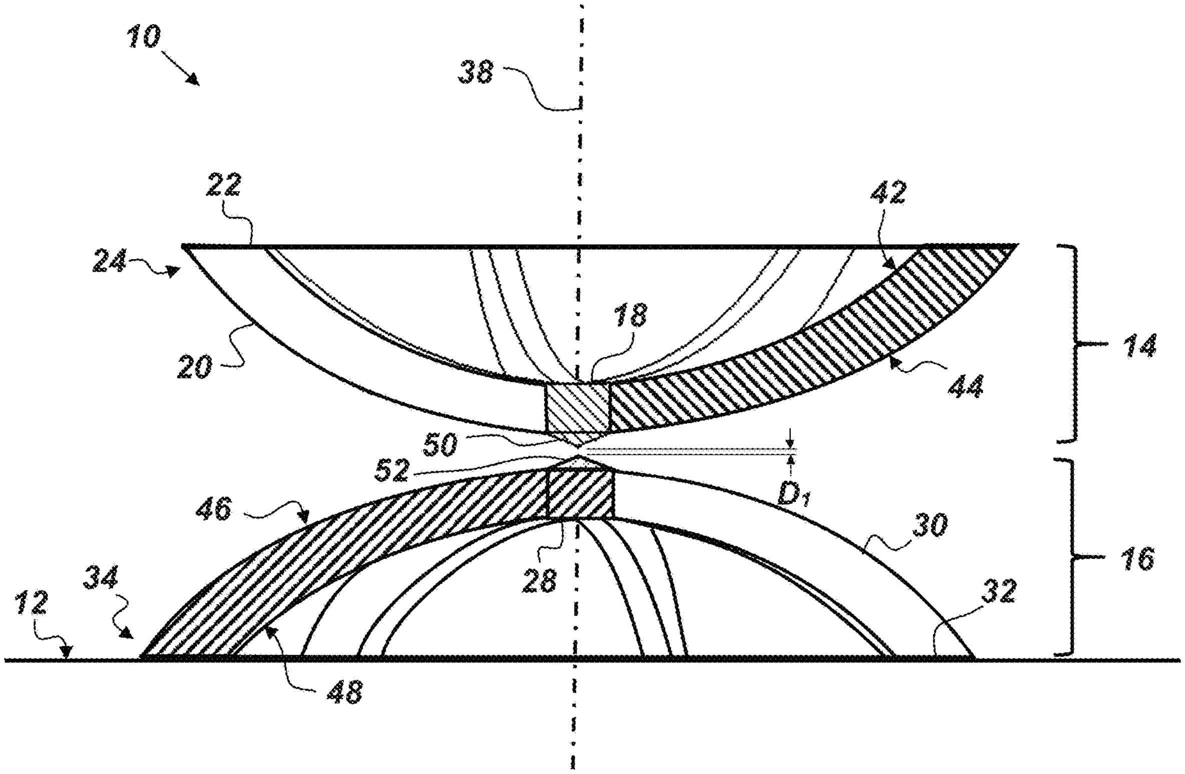
FIG. 2 is a cross-sectional, side-view illustration of an embodiment of a low-profile antenna.

FIG. 2 is a cross-sectional, side-view illustration of another embodiment of the low-profile antenna 10. In this embodiment, the upper antenna section 14 consists of seven upper conductive arms 20 and the lower antenna section 16 consists of seven lower conductive arms 30. Low-profile antenna 10 may be configured as a vertically polarized and azimuthally omnidirectional monopole antenna. Low-profile antenna 10 may be mounted in an upright position on a horizontal or nearly horizontal embodiment of the ground plane 12 such as is depicted in FIG. 2. Each upper conductive arm 20 has a top surface 42 and a bottom surface 44. Each lower conductive arm 30 has a top surface 46 and bottom surface 48. As shown in FIG. 2, the bottom surface 44 and the top surface 46 have exponential tapers. The input impedance of the low-profile antenna 10 will be that of the parallel combination of the individual arms 20 and 30. FIG. 2 also shows an upper feed section 50 as the lowest part of the upper antenna section 14, and a lower feed section 52 as the uppermost part of the lower antenna section 16, which is separated from the upper feed section 50 by a distance $D_1$. Both the upper and lower feed sections 50 and 52 are made of conductive material and are centered on the central axis 38. In the embodiment of the low-profile antenna 10 shown in FIG. 2, the upper and lower feed sections 50 and 52 have conical shapes so that the impedance of the upper antenna section 20 and the lower antenna section 30 respectively match that of the parallel combination of the upper conductive arms 20 and lower conductive arms 30. In one embodiment, the distance $D_1$ may be 0.127 mm (0.005 inches). In the embodiment of the low-profile antenna 10 shown in FIG. 2, the two vertices of the upper and lower feed sections 50 and 52 are respectively located at approximately 23.31 mm (0.918 inches) and 23.43 mm (0.923 inches) above the ground plane 12. The upper and lower feed sections 50 and 52 may be truncated, for example such that the spacing between the upper and lower feed sections 50 and 52 equals the spacing between the center and outer conductors of the coaxial feed line (e.g., feed cable 70 shown in FIG. 4).

Figure 3A:
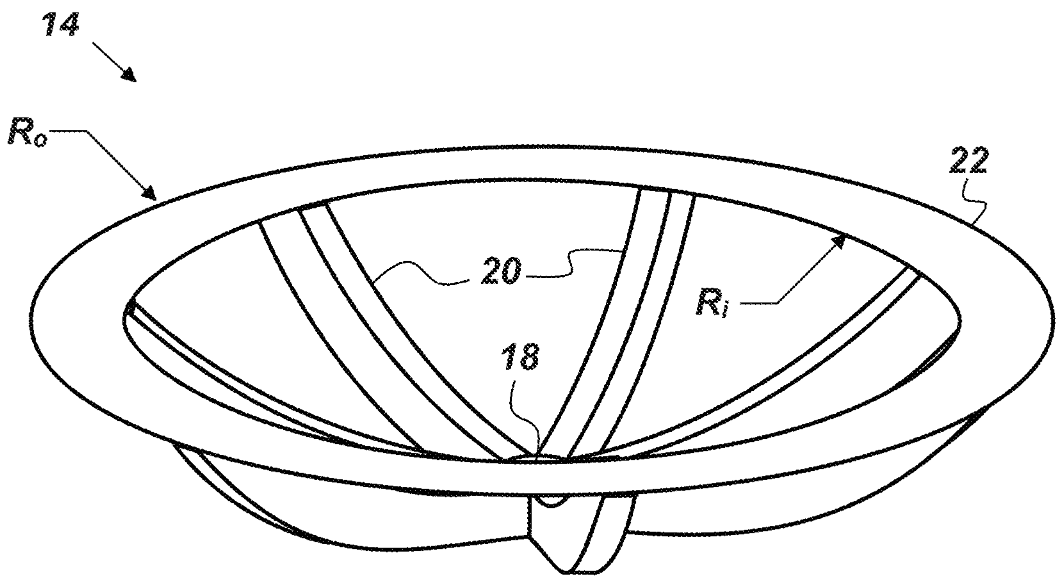
FIGS. 3A and 3B are perspective-view illustrations of a seven-arm embodiment of an upper antenna section.
Figure 3B:
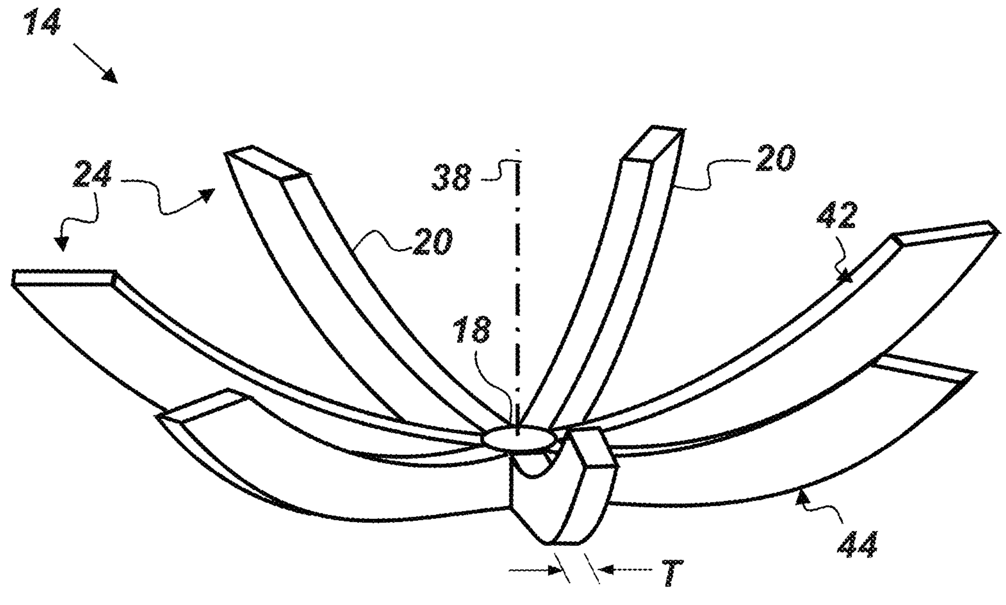

FIGS. 3A and 3B are perspective-view illustrations of the seven-arm embodiment of the upper antenna section 14 shown in FIG. 2. FIG. 3B shows this embodiment of the upper antenna section 14 without the upper conductive ring 22 to facilitate visibility of the other components. The upper arms 20 extend radially from the upper hub 18. Each upper arm 20 is conductive and has a uniform axial thickness T. The upper and lower arms 20 and 30, the upper and lower conductive rings 22 and 32, the ground plane 12, and the upper and lower hubs 18 and 28 may be made of any conductive material. Suitable methods of manufacturing the conductive components of the low-profile antenna 10 include, but are not limited to, using computer numerical controlled (CNC) tool(s) to fabricate the conductive components out of a monolithic piece of conductive metal, fabricating the conductive components separately out of metal and then fastening them together via welding, soldering, conductive epoxy, etc., using additive manufacturing processes (e.g., 3D-printing) to create the conductive components either out of a conductive material or out of a non-conductive base material and then coating the base material with a conductive outer layer. The conductive ring 22 may be positioned on top of the upper arms 20, as shown in FIG. 3A, to provide capacitive loading to the upper antenna section 14. By selecting the thickness T and exponential taper of the individual conductive arms, the input impedance of the low-profile antenna 10 can be set to a desired value, which, for example, could be 50 ohms.

Figure 4:
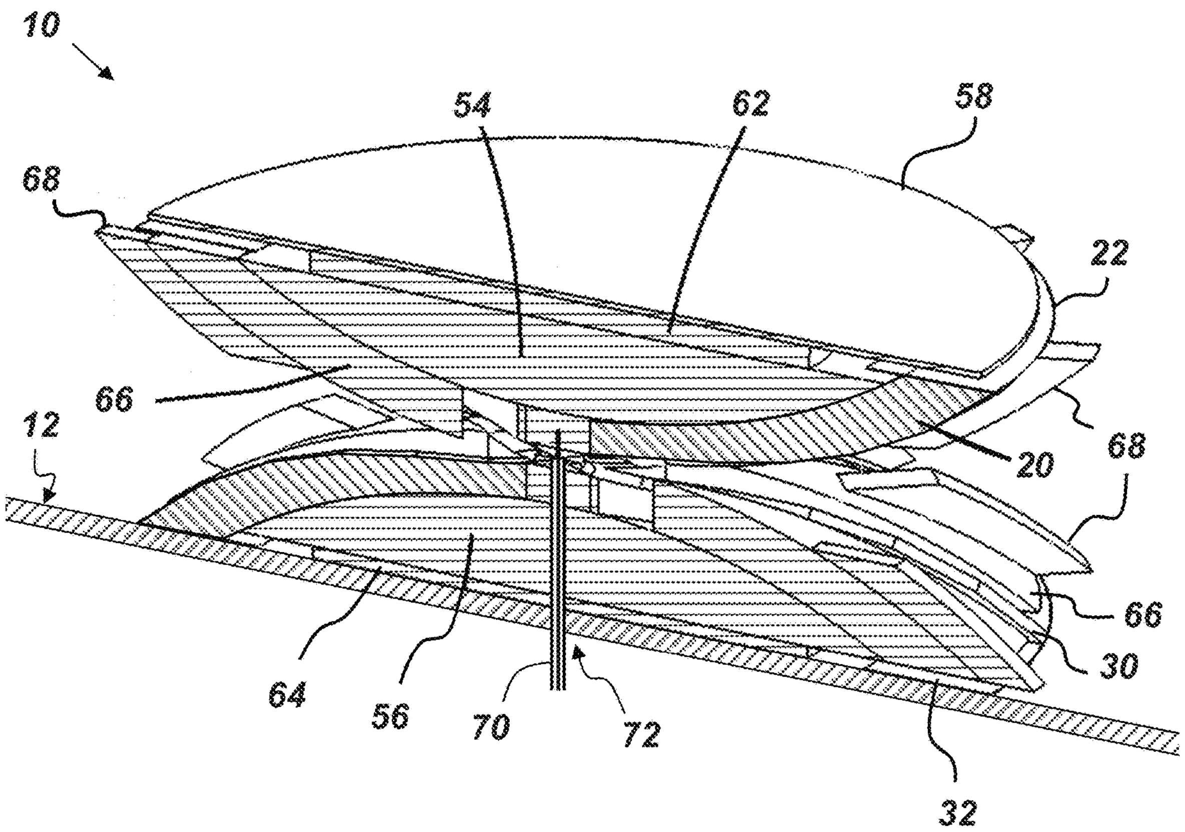
FIG. 4 is a cross-sectional, perspective view of a nine-arm embodiment of a low-profile antenna.
Figure 5:
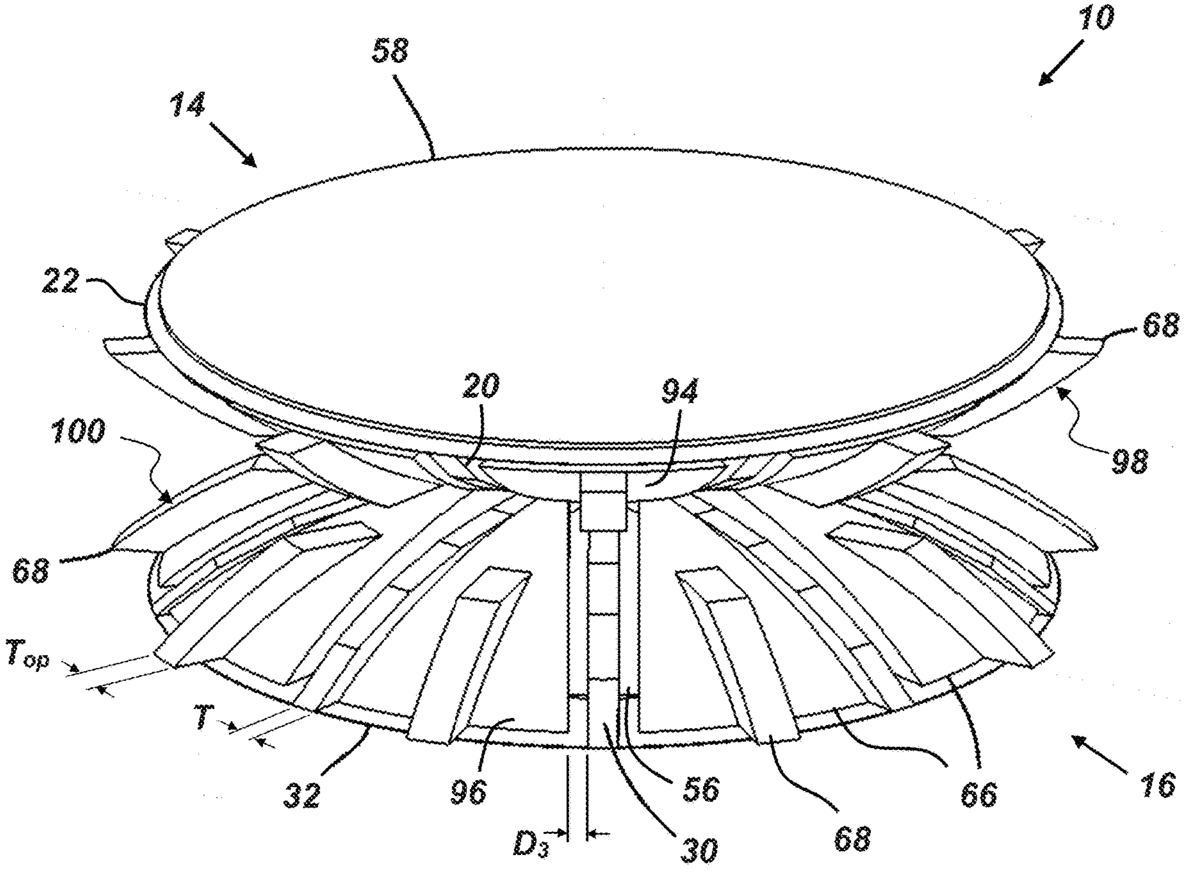
FIG. 5 is a perspective view of a nine-arm embodiment of a low-profile antenna.

FIGS. 4 and 5 are perspective views of a nine-arm embodiment of the low-profile antenna 10 where the upper and lower prolate ellipsoid dome shapes 26 and 36 are substantially filled respectively by upper and lower absorbers 54 and 56, which are both made of RF-absorbing material. FIG. 4 is a perspective, cross-sectional view of the nine-arm embodiment of the low-profile antenna 10. The upper absorber 54 rests against the top surfaces 42 of the upper conductive arms 20, but the upper absorber 54 does not physically contact the upper conductive ring 22. Likewise, the lower absorber 56 may be in contact with the bottom surfaces 48 of the lower conductive arms 30, but the lower absorber 56 is disposed so as not to contact the lower conductive ring 32. The nine-arm embodiment of the low-profile antenna 10 shown in FIG. 4 also comprises an absorber disk 58, upper and lower absorber risers 62 and 64, interstitial absorbers 66, and outer projections 68, all of which are made of RF-absorbing material such as RF-absorbing dielectric foam. A suitable example of RF-absorbing material is Eccosorb LS-24, manufactured by DuPont subsidiary Laird.

The low-profile antenna 10 is vertically polarized and azimuthally omnidirectional, and provides uniform azimuthal gain patterns over a wide frequency range. In the nine-arm embodiment of the low-profile antenna 10 shown in FIGS. 4 and 5, the upper antenna section 14 has been rotated twenty degrees around the center axis 38, so that the upper conductive arms 20 are evenly spaced between the lower conductive arms 30. The low-profile antenna 10 may be mounted in an upright position on a horizontal or nearly horizontal embodiment of the ground plane 12.

Figure 6A:
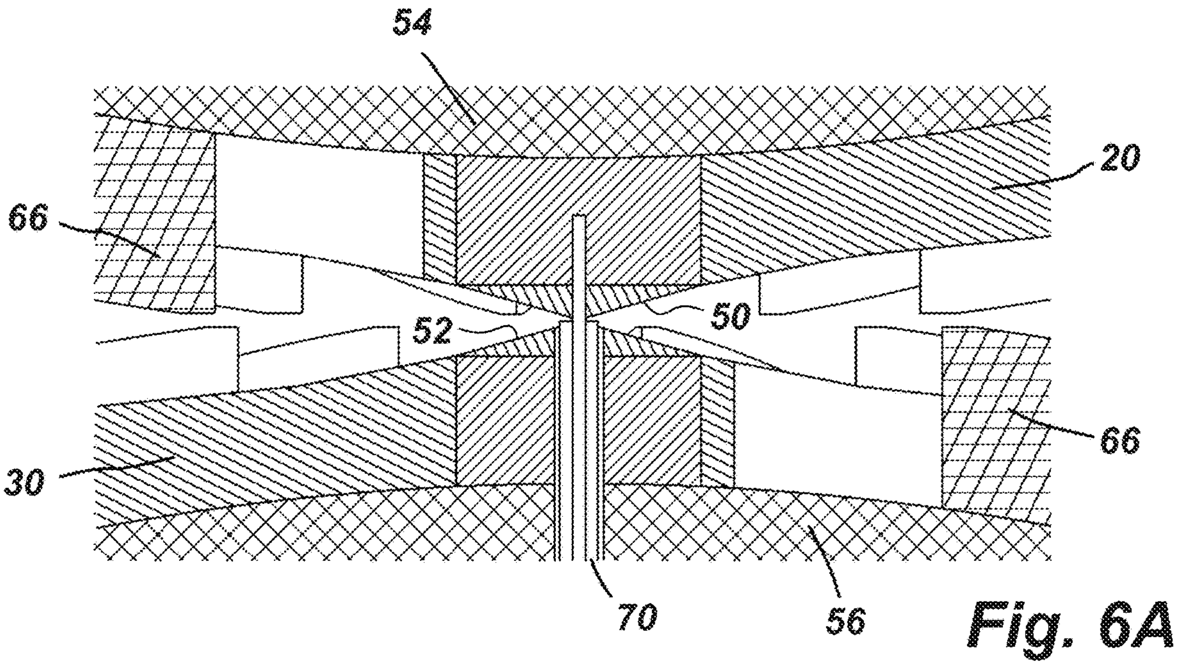
FIGS. 6A and 6B are close-up, partial, cross-sectional, side views of a nine-arm embodiment of a low-profile antenna.
Figure 6B:
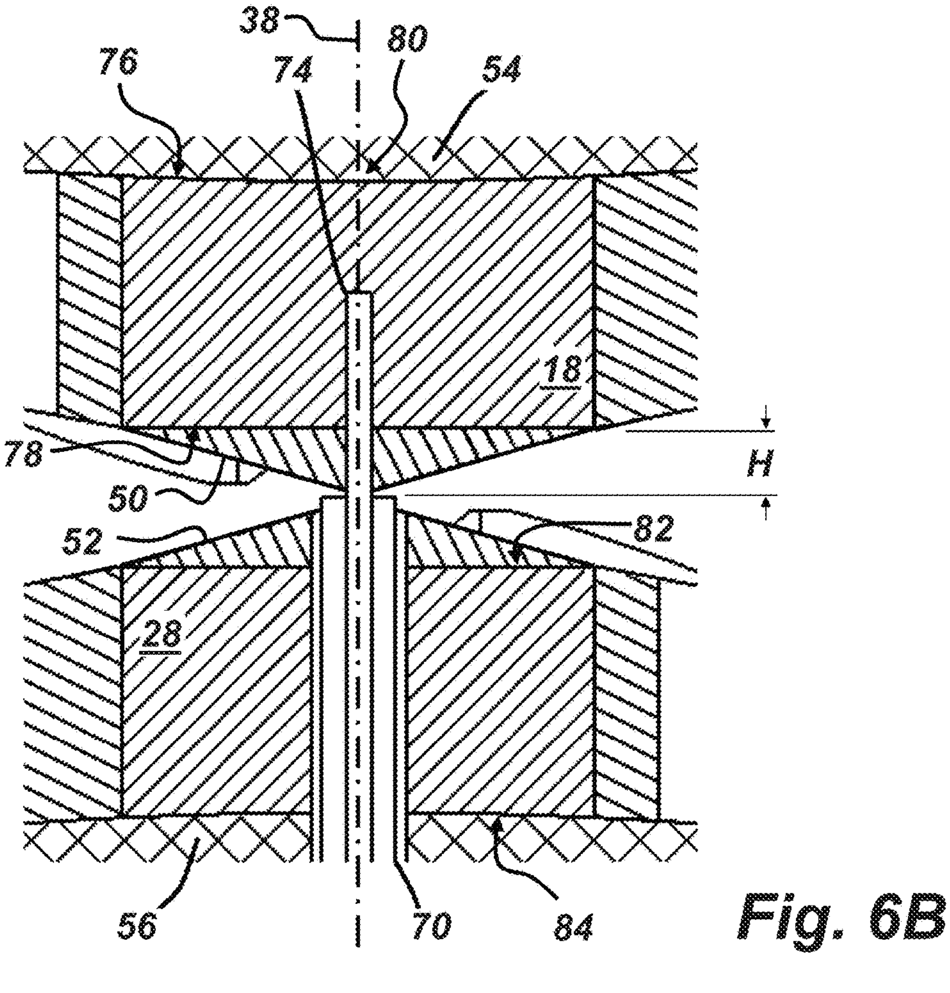

FIGS. 6A and 6B are close-up, partial, cross-sectional, side views of the feed sections 50 and 52 of the nine-arm embodiment of the low-profile antenna 10. In the embodiment shown in FIGS. 6A and 6B, each of the upper and lower feed sections 50 and 52 is a metal cone with a height H of approximately 1.626 mm (0.064 inches) and a radius of approximately 5.38 mm (0.212 inches). The angle of the surface of the cone from the center axis 38 is then approximately 73.2 degrees. For this value of the angle of the cone, the resulting input K of the feed section from its feed point is given by the formula:

$$K = 120 * \ln(\cot(73.2/2)) = 35.7 \text{ ohms} \quad \text{(Eq. 1)}$$

Such an input is a good impedance match with the upper and lower antenna sections 14 and 16. The upper feed section 50 (i.e., the lowest part of the upper antenna section 14) and lower feed section 52 (i.e., the uppermost post of the lower antenna section 16) are shown in FIGS. 6A and 6B as cones with vertices respectively located at approximately 23.43 mm (0.923 inches) and approximately 23.31 mm (0.918 inches) above the ground plane 12 such that their vertices are separated by approximately 0.127 mm (0.005 inches).

RF signals can be supplied to or received from the upper and lower feed sections 50 and 52 by a coaxial feed cable 70, which can be passed up from below through a hole 72 (See FIG. 4) in the ground plane 12, through the lower absorber riser 64, the lower absorber 56, the lower hub 28, and the lower feed section 52. The center conductor 74 of the coaxial feed cable 70 may be inserted in a small-diameter hole, which passes through the upper feed section 50 and into the upper hub 28, as shown in FIGS. 6A and 6B. In the embodiment of the low-profile antenna 10 shown in FIGS. 6A and 6B, the upper and lower feed sections 50 and 52 may not provide an exact match with the 50-ohm impedance of coaxial feed cable 70. However, the effects of this impedance mismatch are deemed not substantial, producing, for example, a return loss of 15.55 dB, a voltage standing wave ratio (VSWR) of 1.4 and a load mismatch attenuation of only 0.12 dB.

In continued reference to the example embodiment of the low-profile antenna 10 shown in FIGS. 6A and 6B, the upper and lower hubs 18 and 28 are cylindrical with a radius of 5.41 mm (0.213 inches). The upper hub 18 has a top surface 76 and a bottom surface 78. The bottom surface 78 mates to the base of the upper feed section 50 and is separated from the ground plane 12 by approximately 25.04 mm (0.986) inches). The top surface 76 conforms the contours of the upper absorber 54, which in this embodiment, has a first prolate ellipsoid dome shape defined by Equation 2 as follows:

$$(x/3.542)^\wedge 2 + ((y - 3.902)/2.695)^\wedge 2 + (z/3.542)^\wedge 2 = 1. \quad \text{(Eq. 2)}$$

The lowermost point 80 of the upper absorber 54, which is also the center point of the top surface 76, is located approximately 30.66 mm (1.207 inches) above the ground plane 12. The lower hub 28 has a top surface 82 and a bottom surface 84. The top surface 82 mates to the base of the lower feed section 52 and is separated from the ground plane 12 by approximately 21.69 mm (0.854 inches). The bottom surface 84 conforms the contours of the lower absorber 56, which in this embodiment, has a second prolate ellipsoid dome shape defined by Equation 3 as follows:

$$(x/3.542)^\wedge 2 + ((y + 2.061)/2.695)^\wedge 2 + (z/3.542)^\wedge 2 = 1 \quad \text{(Eq. 3)}$$

The uppermost point 86 of the lower absorber 56, which is also the center point of the bottom surface 84, is located approximately 16.1 mm (0.634 inches) above the ground plane 12.

Figure 7:
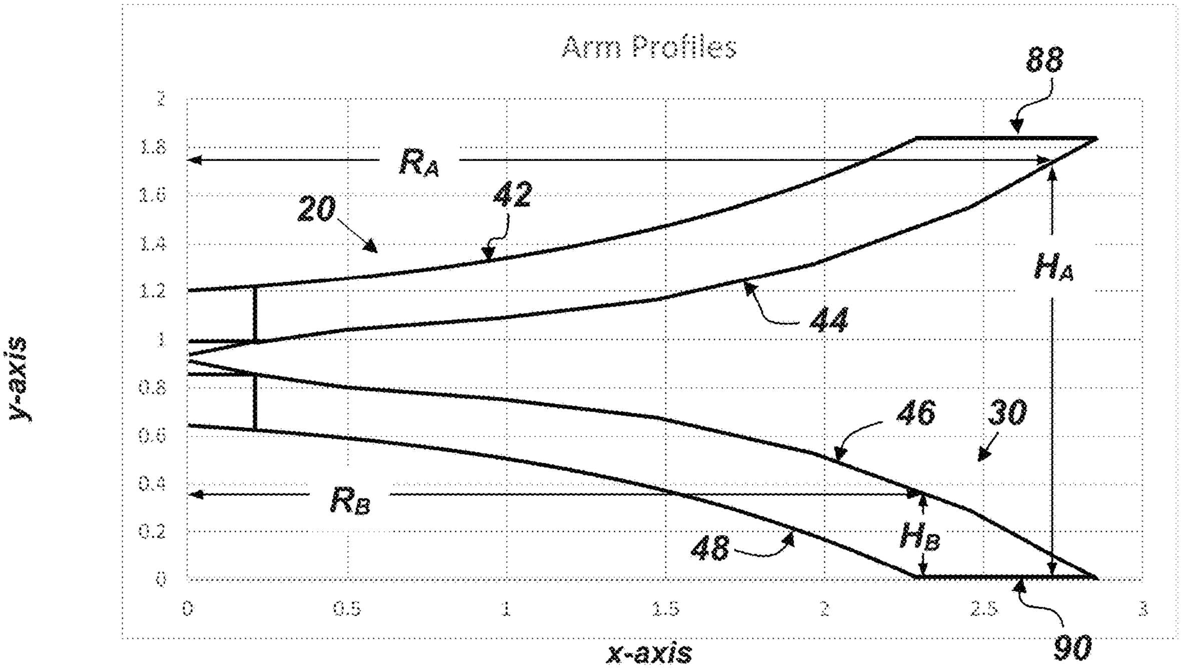
FIG. 7 is a chart showing example profiles of embodiments of upper and lower conductive arms of a low-profile antenna.

FIG. 7 is a chart showing example profiles of embodiments of the upper and lower conductive arms 20 and 30 respectively. While the embodiments of the upper and lower conductive arms 20 and 30 shown in FIG. 7 are depicted as being in the same x-y plane, it is to be understood that in some embodiments of the low-profile antenna 10, the upper and lower conductive arms 20 and 30 may be offset from each other, such as is shown, by way of example, in FIGS. 4 and 5. For the bottom surface 44 of the upper conductive arm shown in FIG. 7, the horizontal radius RA from the feed point (represented by the y-axis) and height HA above the ground plane 12 (represented by the x-axis) can be defined by the following data points:

$$(x_{1A}, y_{1A}) = (5.385 \text{ mm } (0.212 \text{ inches}), 25.04 \text{ mm } (0.986 \text{ inches}))$$

$$(x_{2A}, y_{2A}) = (12.47 \text{ mm } (0.491 \text{ inches}), 26.39 \text{ mm } (1.039 \text{ inches}))$$

$$(x_{3A}, y_{3A}) = (24.92 \text{ mm } (0.981 \text{ inches}), 27.64 \text{ mm } (1.088 \text{ inches}))$$

$$(x_{4A}, y_{4A}) = (37.39 \text{ mm } (1.472 \text{ inches}), 29.59 \text{ mm } (1.165 \text{ inches}))$$

$$(x_{5A}, y_{5A}) = (49.86 \text{ mm } (1.963 \text{ inches}), 33.35 \text{ mm } (1.313 \text{ inches}))$$

$$(x_{6A}, y_{6A}) = (62.31 \text{ mm } (2.453 \text{ inches}), 39.34 \text{ mm } (1.549 \text{ inches}))$$

$$(x_{7A}, y_{7A}) = (72.47 \text{ mm } (2.853 \text{ inches}), 46.61 \text{ mm } (1.835 \text{ inches}))$$

An uppermost horizontal surface 88 of the upper conductive arm 20, for this example, can be defined by the points:

$$(x_{7A}, y_{7A}) = (72.47 \text{ mm } (2.853 \text{ inches}), 46.61 \text{ mm } (1.835 \text{ inches}))$$

$$(x_{8A}, y_{8A}) = (57.81 \text{ mm } (2.276 \text{ inches}), 46.61 \text{ mm } (1.835 \text{ inches}))$$

The top surface 42 of the upper conductive arm 20 is bounded in this example by a bottom contour of a prolate ellipsoid defined by Equation 2.

For the top surface 46 of the lower conductive arm 30 shown in FIG. 7, the horizontal radius $R_B$ from the feed point (represented by the y-axis) and height $H_B$ above the ground plane 12 (represented by the x-axis) can be defined by the following data points:

$$(x_{1B}, y_{1B}) = (5.38 \text{ mm } (0.212 \text{ inches}), 21.69 \text{ mm } (0.854 \text{ inches}))$$

$$(x_{2B}, y_{2B}) = (12.47 \text{ mm } (0.491 \text{ inches}), 20.35 \text{ mm } (0.801 \text{ inches}))$$

$$(x_{3B}, y_{3B}) = (24.92 \text{ mm } (0.981 \text{ inches}), 19.1 \text{ mm } (0.752 \text{ inches}))$$

$$(x_{4B}, y_{4B}) = (37.39 \text{ mm } (1.472 \text{ inches}), 17.15 \text{ mm } (0.675 \text{ inches}))$$

-continued $$(x_{5B}, y_{5B}) = (49.86\text{ mm }(1.963\text{ inches}),\ 13.39\text{ mm }(0.527\text{ inches}))$$

$$(x_{6B}, y_{6B}) = (62.31\text{ mm }(2.453\text{ inches}),\ 7.39\text{ mm }(0.291\text{ inches}))$$

$$(x_{7A}, y_{7B}) = (72.47\text{ mm }(2.853\text{ inches}),\ 0.127\text{ mm }(0.005\text{ inches}))$$

A lowest horizontal surface 90 of this example of the lower conductive arm 30 can be defined by the points:

$$(x_{7A}, y_{7B}) = (72.47\text{ mm }(2.853\text{ inches}),\ 0.127\text{ mm }(0.005\text{ inches}))$$

$$(x_{8B}, y_{8B}) = (57.81\text{ mm }(2.276\text{ inches}),\ 0.127\text{ mm }(0.005\text{ inches}))$$

The bottom surface 48 of the lower conductive arm 30 is bounded in this example by a top contour of a prolate ellipsoid defined by Equation 3.

Continuing with the description of the nine-arm embodiment of the low-profile antenna 10 shown in FIGS. 4 and 5, each of the upper conductive arms 20 are separated from each other by (360/9)=40.0 degrees. Likewise, the lower conductive arms 30 are separated from each other by 40 degrees. In the nine-arm embodiment of the low-profile antenna 10 shown in FIGS. 4 and 5, the upper antenna section 14 is rotationally offset from the lower antenna section 16 about the center axis 38 by 20.0 degrees such that each upper conductive arm 20 is rotationally offset from its nearest two lower conductive arms 30 by 20.0 degrees. Each upper conductive arm 20 and each lower conductive arm 30, for the nine-arm embodiment of the low-profile antenna 10 shown in FIGS. 4 and 5, has a thickness T of 4.67 mm (0.184 inches) to give each arm an impedance of 350 ohms. Each upper conductive arm 20, with the dimensions and thickness T given above, together with its nearby lower conductive arms 30, form a tapered-slot antenna element, with an impedance of 350 ohms. The nine upper conductive arms 20 are connected to the upper hub 18 and the nine lower conductive arms 30 are connected to the lower hub 28, as shown in FIG. 6B—resulting in a combined parallel input impedance of (350/9)=38.9 ohms, closely matching the 35.7 ohm input impedance of the upper feed section 50 combined with the lower feed section 52. The upper conductive ring 22, connected to the uppermost horizontal surfaces 88 of the upper conductive arms 20 provides capacitive loading for the nine upper conductive arms 20. In the nine-arm embodiment described above, the upper conductive ring 22 has a thickness $T_r$ of 0.127 mm (0.005 inch), an outer radius $R_o$ of approximately 72.47 mm (2.85 inches), and an inner radius $R_1$ of approximately 51.41 mm (2.02 inches). Similarly, lower conductive ring 32 provides capacitive loading for the lower conductive arms 30 and may also have the same dimensions as the upper conductive ring 22. For the example here, the lower conductive ring is in contact with the ground plane 12.

Figure 8A:
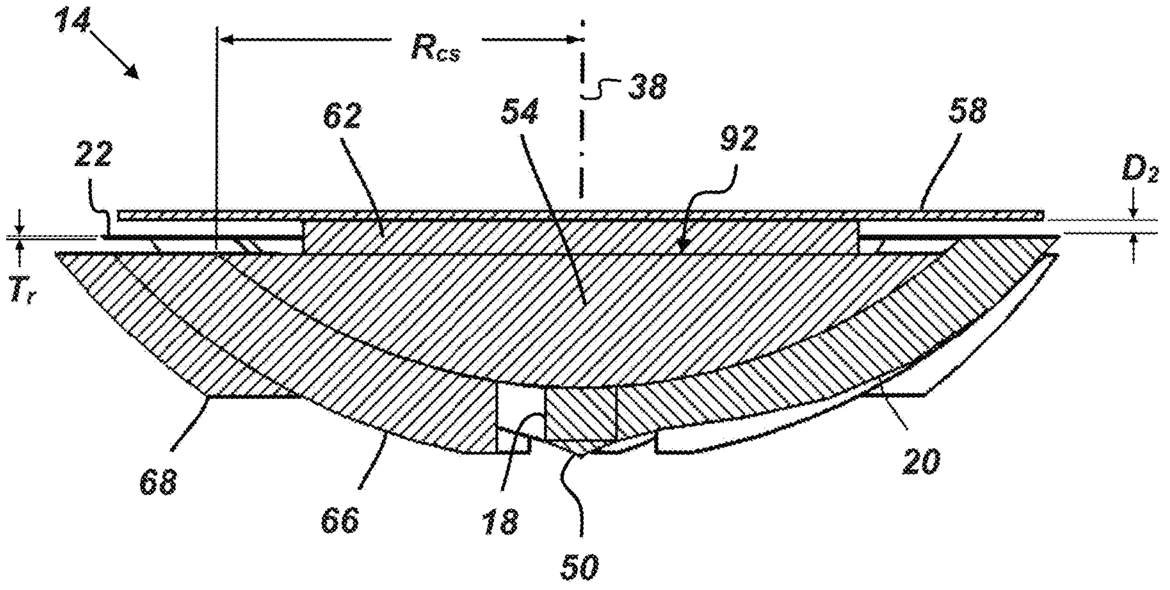
FIG. 8A is a cross-sectional, side-view of an embodiment of an upper antenna section of an embodiment of a low-profile antenna.
Figure 8B:
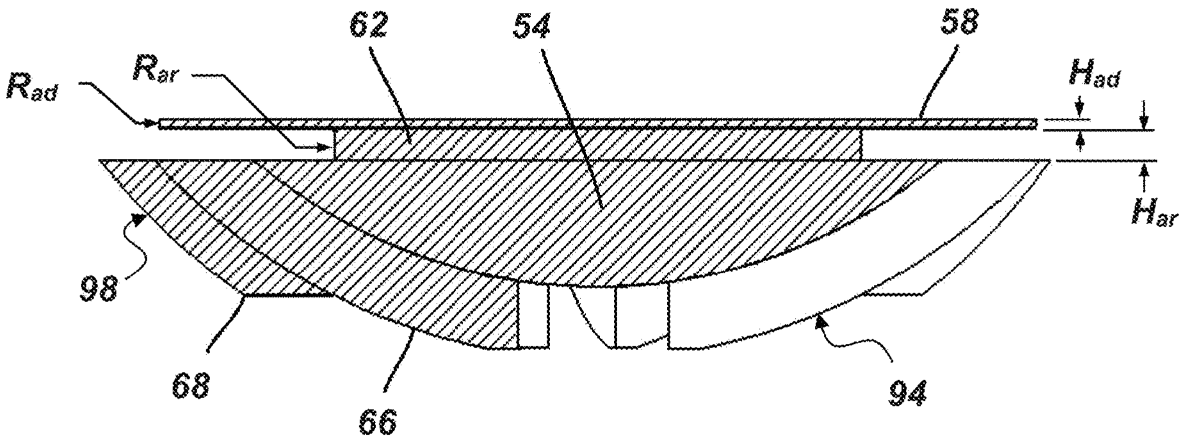
FIG. 8B is a cross-sectional, side-view of RF-absorbing components of an upper antenna section of an embodiment of a low-profile antenna.

FIG. 8A is a cross-sectional, side-view of an embodiment of the upper antenna section 14 showing the upper absorber 54, the absorber riser 62, the absorber disk 58, interstitial absorbers 66, and absorber outer projections 68, all of which are made of RF-absorbing material such as RF-absorbing dielectric foam. FIG. 8B is a cross-sectional, side-view of the upper absorber 54, the absorber riser 62, the absorber disk 58, interstitial absorbers 66, and outer projections 68 without showing the conductive portions of the upper antenna section 14 (e.g., upper conductive arm 20, upper conductive ring 22, upper hub 18, and upper feed section 50).

In the embodiment of the upper antenna section 14 shown in FIGS. 8A and 8B, the upper absorber 54 is in contact with the top surfaces 42 of the upper conductive arms 20, but an upper flat circular surface 92 does not touch the upper conductive ring 22. The upper flat circular surface 92 may be parallel to the x-z plane, or ground plane 12, have a radius $R_{cs}$ of approximately 54.92 mm (2.16 inches), and be located at approximately y=44.88 mm (1.77 inches). The upper absorber riser 62 is disposed on top of the upper absorber 54. It is desirable that the absorber riser 62 not touch the upper conductive ring 22. In the embodiment of the upper antenna section 14 shown in FIGS. 8A and 8B, the upper absorber riser 62 is cylindrical with an axis that is aligned with the center axis 38, having a radius $R_{ar}$ of approximately 42.1 mm (1.66 inches) and a height $H_{ar}$ of approximately 3.56 mm (0.14 inches). The height $H_{ar}$ of the upper absorber riser 62 in this embodiment extends from y=44.88 mm (1.77 inches) to y=48.44 mm (1.91 inches). The lower absorber 56 may have the same dimensions as the upper absorber 54. The lower absorber riser 64 may have the same radius $R_{ar}$ as the upper absorber riser 62. In one embodiment, the lower absorber riser 64 has a height of 1.85 mm (0.073 inches) and is disposed between the ground plane 12 and the lower absorber 56.

The absorber disk 58 is disposed on top of the upper absorber riser 62. In the embodiment depicted in FIGS. 8A and 8B, the absorber disk 58 is cylindrical in shape, with its axis aligned with the center axis 38, has a radius $R_{ad}$ of approximately 70.1 mm (2.76 inches), and a height $H_{ad}$ of 0.89 mm (0.035 inches). The absorber disk 58 has a radius $R_{ad}$ that is larger than the inner radius $R_i$ and smaller than the outer radius $R_o$ of the upper conductive ring 22. The absorber disk 58 does not touch the upper conductive ring 22. In the example embodiment of the upper antenna section 14 shown in FIGS. 8A and 8B, the absorber disk 58 is separated from the upper conductive ring 22 by a distance $D_2$, which in the depicted embodiment is approximately 1.7 mm (0.067 inches).

Returning to the embodiment of the low-profile antenna 10 shown in FIG. 5, an interstitial absorber 66 projects from either the upper absorber 54 or the lower absorber 56 such that an interstitial absorber 66 is disposed between every two upper conductive arms 20 and every two lower conductive arms 30. Each interstitial absorber 66 is connected to a corresponding outer projection 68, which is also equally spaced between two upper conductive arms 20 or two lower conductive arms 30. The interstitial absorbers 66 and outer projections 68 of the upper antenna section 14 are spaced equidistantly between the upper conductive arms 20. Likewise, the interstitial absorbers 66 and outer projections 68 of the lower antenna section 16 are spaced equidistantly between the lower conductive arms 30. The interstitial absorbers 66 of the upper antenna section 14 have outer surfaces 94 that conform to contours of a third prolate ellipsoid defined by Equation 4 as follows:

$$(x/3.956)^\wedge 2+((y-3.902)/3.010)^\wedge 2+(z/3.956)^\wedge 2=1. \quad \text{(Eq. 4)}$$

In the embodiment of the low-profile antenna 10 shown in FIG. 5, each interstitial absorber 66 of the upper antenna section 14 extends from approximately y=23.62 mm (0.93 inches), where it is truncated, up to approximately y=44.88 mm (1.77 inches). The interstitial absorbers 66 do not touch, and are spaced apart from, the upper and lower conductive arms 20 and 30 on either side by a distance $D_3$, which in this embodiment is approximately 3.15 mm (0.124 inches). The interstitial absorbers 66 of the lower antenna section 16 have outer surfaces 96 that conform to contours of a fourth prolate ellipsoid defined by Equation 5 as follows:

$$(x/3.956)^{\wedge}2+((y+2.061)/3.010)^{\wedge}2+(z/3.956)^{\wedge}2=1. \quad \text{(Eq. 5)}$$

In the embodiment of the low-profile antenna 10 shown in FIG. 5, each interstitial absorber 66 of the lower antenna section 16 extends from approximately y=1.85 mm (0.073 inches) up to y=22.94 mm (0.903 inches), where it is truncated. In the embodiment of the low-profile antenna 10 shown in FIG. 5, each of the outer projections 68 has thickness Top that is approximately double the thickness T of the upper and lower conductive arms 20 and 30, or approximately 7.01 mm (0.276 inches).

Still in reference to the embodiment of the low-profile antenna 10 shown in FIG. 5, the outer projections 68 of the upper antenna section 14 in this embodiment may be described as having rectangular cross sections with outer surfaces 98 that conform to the contours of a lower part of a fifth prolate ellipsoid defined by Equation 6 as follows:

$$(x/4.140)^{\wedge}2+((y-3.832)/3.150)^{\wedge}2+(z/4.140)^{\wedge}2=1. \quad \text{(Eq. 6)}$$

The outer projections 68 of the upper antenna section 14 may be bounded between y=29.77 mm (1.172 inches), and y=44.88 mm (1.767 inches), and with a width of 7.01 mm (0.276 inches). The outer projections 68 of the lower antenna section 16 in this embodiment may be described as having rectangular cross sections with outer surfaces 100 that conform to the contours of an upper part of a sixth prolate ellipsoid defined by Equation 7 as follows:

$$(x/4.140)^{\wedge}2+((y+1.991)/3.150)^{\wedge}2+(z/4.140)^{\wedge}2=1. \quad \text{(Eq. 7)}$$

The outer projections 68 of the lower antenna section 16 may be bounded between y=1.85 mm (0.073 inches) and y=16.99 mm (0.67 inches), and with a width of 7.01 mm (0.276 inches).

Figure 9A:
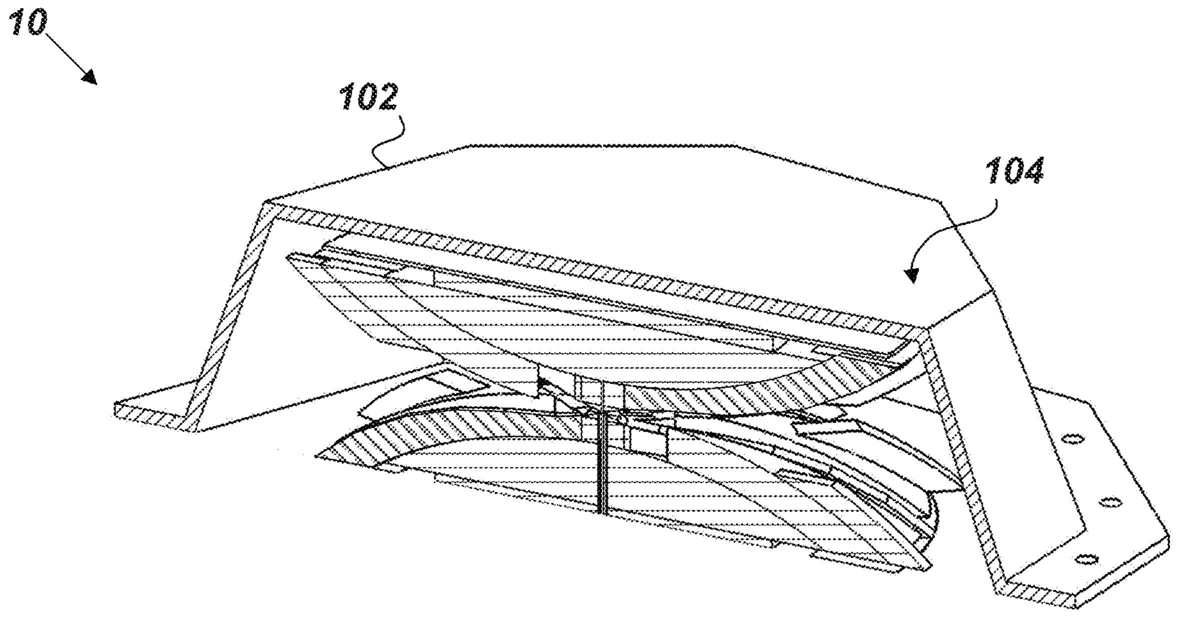
FIG. 9A is a cross-sectional, perspective-view illustration of an embodiment of a low-profile antenna.
Figure 9B:
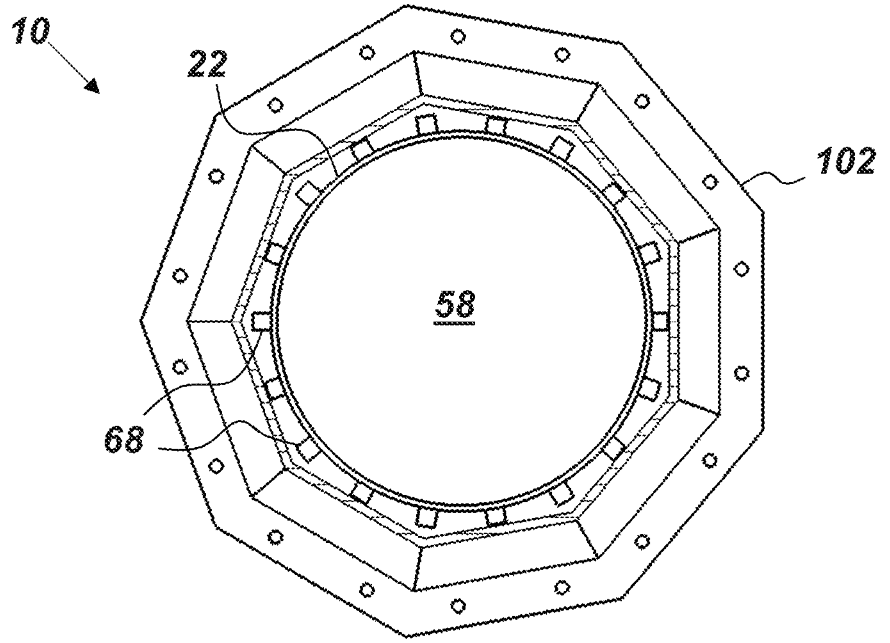
FIG. 9B is a cross-sectional, top-view illustration of an embodiment of a low-profile antenna.

FIG. 9A is a cross-sectional, perspective view illustration of an embodiment of the low-profile antenna 10 with a housing 102 that is non-conductive and RF-transparent. FIG. 9B is a cross-sectional, top-view illustration of the embodiment of the low-profile antenna 10 shown in FIG. 9A with a top surface 104 removed to facilitate viewing of the internal components of the low-profile antenna 10. In FIG. 9B, eighteen outer projections 66 are viewable, nine corresponding to the upper antenna section 14 and nine corresponding to the lower antenna section 16.

When the low-profile antenna 10 is in a receive mode, incoming electromagnetic waves may be incident on each of the upper conductive arms 20 and the lower conductive arms 30. As discussed above, upper conductive arm 20, together with the nearest lower conductive arm 30, acts substantially as a tapered-slot or Vivaldi antenna element, with an input impedance of approximately 350 ohms. With respect to the nine-arm embodiment of the low-profile antenna 10 shown in FIG. 9A, the nine upper conductive arms 20 are connected in parallel, as are the nine lower conductive arms 30, forming a combined impedance of about 39 ohms, providing an approximate match to the impedance of the upper and lower feed sections 50 and 52. The upper conductive ring 22 and the lower conductive ring 32 provide capacitive loading to the upper and lower conductive arms 20 and 30 respectively. The combined radio-frequency current collected by the upper and lower conductive arms 20 and 30 then flows on the outer surfaces of the upper and lower feed sections 50 and 52, until it reaches coaxial feed cable 70, whose center conductor 74 is inserted into the small-diameter hole, which passes through the upper feed section 50. The outer conductor (i.e., conducting shield) (not shown) of the coaxial feed cable 70 may be connected to the lower feed section 52. The coaxial feed cable 70 may then be routed through the lower feed section 52, the lower hub 28, the lower absorber 56, the lower absorber riser 64, and then through the hole 72 in the ground plane 12. The coaxial feed cable 70 may be used to carry RF currents from the low-profile antenna 10 to receiving equipment when in receive mode. When the low-profile antenna 10 is in a transmitting mode, the operation for transmitting is the reverse of the operation described for receiving.

It is advantageous that the RF currents flow mostly on the bottom surfaces 44 of the upper conductive arms 20 and on the top surfaces 46 of the lower conductive arms 30 where it is not absorbed by the RF absorbing material. The gain of the low-profile antenna 10 at the horizon is very uniform with respect to azimuth over the a broad range of frequencies with a variation of less than two dB. The RF-absorbing components of the low-profile antenna 10 can reduce the average maximum and minimum gains of the low-profile antenna 10 by about two dB in some frequency ranges. The RF-absorbing components of the low-profile antenna 10 can reduce the average, maximum and minimum gains of the low-profile antenna 10, but the antenna has acceptable gains for all azimuth angles over a wide frequency range.

From the above description of the low-profile antenna 10, it is manifest that various techniques may be used for implementing the concepts of low-profile antenna 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the low-profile antenna 10 is not limited to the particular embodiments described herein, but is capable of many embodiments without departing from the scope of the claims.

I claim:

1. A low-profile antenna comprising:

an upper set of conductive arms capacitively loaded by an upper conductive ring connected to distal ends of the upper set of conductive arms, wherein each conductive arm of the upper set has an edge that conforms to a prolate ellipsoid dome shape that has a major axis that aligns with a center axis, wherein the upper set of conductive arms converge at an upper hub at a crown of the prolate ellipsoid dome shape, an interior of which is substantially filled with an upper absorber made of RF-absorbing material; and a lower set of conductive arms capacitively loaded by a lower conductive ring, which is connected to a ground plane and to distal ends of the lower set of conductive arms, wherein each of the conductive arms of the lower set has an edge that conforms to an inverted prolate ellipsoid dome shape that has a major axis that aligns with the center axis, wherein the lower set of conductive arms converge at a lower hub at a crown of the inverted prolate ellipsoid dome shape, an interior of which is substantially filled with a lower absorber made of RF-absorbing material, wherein the upper and lower hubs are separated by an air gap.

2. The low-profile antenna of claim 1, further comprising:

a plurality of upper interstitial absorbers made of RF-absorbing material and connected to the upper absorber, wherein the upper interstitial absorbers fill spaces between the upper conductive arms without physically touching the upper conductive arms; and a plurality of lower interstitial absorbers made of RF-absorbing material and connected to the lower absorber, wherein the lower interstitial absorbers fill spaces between the lower conductive arms without physically touching the lower conductive arms.

3. The low-profile antenna of claim 2, further comprising:

a plurality of upper RF-absorbing projections protruding from corresponding upper interstitial absorbers, one upper RF-absorbing projection equidistantly-spaced between every two arms of the upper set of conductive arms; and a plurality of lower RF-absorbing projections protruding from corresponding lower interstitial absorbers, one lower RF-absorbing projection equidistantly-spaced between every two arms of the lower set of conductive arms.

4. The low-profile antenna of claim 3, further comprising:

a disk of RF-absorbing material disposed above, without touching, the upper conductive ring, and wherein the disk has a diameter that is larger than an inner diameter and smaller than an outer diameter of the upper conductive ring.

5. The low-profile antenna of claim 4, wherein each of the conductive arms of the upper and lower sets has an arm thickness, and wherein each of the plurality of upper and lower RF-absorbing projections has a thickness that is approximately double the arm thickness.

6. The low-profile antenna of claim 5, wherein the lower conductive ring is positioned in direct contact with the ground plane.

7. The low-profile antenna of claim 6, wherein each of the upper and lower sets of conductive arms consists of an equal amount of arms, and wherein the upper set of conductive arms is rotationally offset about the center axis from the lower set of conductive arms such that no two arms of the upper and lower sets of conductive arms are vertically aligned with each other.

8. The low-profile antenna of claim 7, wherein the conductive arms of the upper set are equidistantly spaced from each other and the conductive arms of the lower set are equidistantly spaced from each other.

9. The low-profile antenna of claim 8, wherein each of the upper and lower sets of conductive arms consists of nine equidistantly-spaced arms, and wherein the upper set of conductive arms is rotationally offset from the lower set of conductive arms, about the center axis, by 20°.

10. A low-profile antenna comprising:

a ground plane;

an upper antenna section having an upper hub, an upper set of conductive arms extending radially from the upper hub, and an upper conductive ring disposed parallel to the ground plane and electrically connected to distal ends of each of the arms of the upper set, wherein each arm of the upper set has a surface that substantially conforms to an upper prolate ellipsoid dome shape that has a crown aligned with the upper hub and a base aligned with the upper conductive ring;

a lower antenna section having a lower hub, a lower set of conductive arms extending radially from the lower hub, and a lower conductive ring disposed parallel to, and in contact with, the ground plane and electrically connected to distal ends of each of the arms of the lower set of conductive arms, wherein each arm of the lower set of conductive arms has a surface that substantially conforms to a lower prolate ellipsoid dome shape that has a crown aligned with the lower hub and a base aligned with the lower conductive ring;

wherein the upper and lower antenna sections share a common center axis and the upper and lower hubs are separated by an air gap; and wherein the upper antenna section is rotationally offset from the lower antenna section about the center axis such that no two arms of the upper and lower sets of conductive arms are vertically aligned with each other.

11. The low-profile antenna of claim 10, wherein each of the upper and lower sets of conductive arms consists of an equal amount of arms.

12. The low-profile antenna of claim 11, wherein the upper and lower sets of conductive arms are rotationally offset from each other to the greatest extent possible.

13. The low-profile antenna of claim 12, wherein the conductive arms of the upper set are equidistantly spaced from each other and the conductive arms of the lower set are equidistantly spaced from each other.

14. The low-profile antenna of claim 13, wherein the upper and lower sets of conductive arms each consists of nine arms and the upper antenna section is rotated 20° from the lower antenna section.

15. The low profile antenna of claim 13, wherein the upper and lower antenna sections respectively comprise upper and lower absorbers, made of RF-absorbing material, that substantially fill the upper and lower prolate ellipsoid domes respectively without touching the upper and lower conductive rings.

16. The low-profile antenna of claim 15, wherein:

the upper antenna section further comprises an upper riser and a disk made of RF-absorbing material, wherein the upper riser is disposed immediately above the upper absorber and has a diameter and height that are respectively smaller and larger than an inner diameter and height of the upper conductive ring, and wherein the disk has a diameter that is larger than the inner diameter and smaller than an outer diameter of the upper conductive ring; and wherein the lower antenna section further comprises a lower riser made of RF-absorbing material and disposed between the lower absorber and the ground plane, wherein the lower riser has a diameter that is smaller to an inner diameter of the lower conductive ring.

17. The low-profile antenna of claim 16, further comprising:

a plurality of upper interstitial absorbers made of RF-absorbing material and connected to the upper absorber, wherein the upper interstitial absorbers fill spaces between the upper conductive arms without physically touching the upper conductive arms; and a plurality of lower interstitial absorbers made of RF-absorbing material and connected to the lower absorber, wherein the lower interstitial absorbers fill spaces between the lower conductive arms without physically touching the lower conductive arms.

18. The low-profile antenna of claim 17, further comprising:

a plurality of upper outer projections each of which being made of RF-absorbing material and protruding from a corresponding upper interstitial absorber, wherein each upper outer projection is equidistantly spaced between two given arms of the upper set of conductive arms;

a plurality of lower outer projections each of which being made of RF-absorbing material and protruding from a corresponding lower interstitial absorber, wherein each lower outer projection is equidistantly spaced between two given arms of the lower set of conductive arms; and wherein the upper and lower outer projections extend outwardly from the center axis by a distance greater than a distance between any given conductive arm and the center axis.

19. The low-profile antenna of claim 18, wherein each of the plurality of upper outer projections has an outer surface defined by an upper outer prolate ellipsoid dome shape; and wherein each of the plurality of lower outer projections has an outer surface defined by a lower outer prolate ellipsoid dome shape.

20. The low-profile antenna of claim 19, further comprising a non-conductive, RF-transparent housing connected to the ground plane and configured to cover and support the upper and lower antenna sections.

* * * * *